US007070189B2

(12) United States Patent
Grauss

(10) Patent No.: US 7,070,189 B2
(45) Date of Patent: Jul. 4, 2006

(54) ADJUSTABLE-HEIGHT CREEPER WITH ANGLED HEAD PIECE

(76) Inventor: Myk Reid Grauss, 3204 Tharp Dr., Laporte, CO (US) 80535-1137

( * ) Notice: Subject to any disclaimer, the term of this patent is extended or adjusted under 35 U.S.C. 154(b) by 0 days.

(21) Appl. No.: 10/384,689

(22) Filed: Mar. 11, 2003

(65) Prior Publication Data

US 2004/0178589 A1 Sep. 16, 2004

(51) Int. Cl.
*B62B 3/02* (2006.01)

(52) U.S. Cl. ................... 280/32.6; 280/79.11; 108/147

(58) Field of Classification Search ............... 280/32.5, 280/32.6, 87.05, 79.11, 79.2, 47.41, 47.18; 248/346.07; 108/147, 130, 65, 90; 182/141
See application file for complete search history.

(56) References Cited

U.S. PATENT DOCUMENTS 1,327,103 A * 1/1920 Knowles .................... 280/32.6
1,457,117 A * 5/1923 London et al. ............ 280/32.6
1,631,561 A * 6/1927 Symmes .................... 280/32.5
2,843,391 A * 7/1958 Pelletier .................... 280/32.6
3,110,476 A * 11/1963 Farris ......................... 254/122
3,237,921 A * 3/1966 Jay ............................ 254/122
3,308,485 A * 3/1967 Nesbit-Evans ................. 5/611
3,361,437 A * 1/1968 Loftis ......................... 280/32.6
4,244,594 A * 1/1981 Hines ........................ 280/32.6
4,577,821 A * 3/1986 Edmo et al. ................ 108/145
4,655,466 A * 4/1987 Hanaoka ................ 280/47.371
4,682,750 A * 7/1987 Rudolph et al. ............ 108/145
4,741,512 A * 5/1988 Elkuch et al. .............. 254/9 C
4,792,147 A * 12/1988 Wissing ..................... 280/32.6
4,875,694 A * 10/1989 Hamrick .................... 280/32.6
4,889,352 A * 12/1989 Chamberlin et al. ....... 280/32.6
4,895,380 A * 1/1990 Brooks et al. ............. 280/32.6
4,925,197 A * 5/1990 Jones, Jr. ................... 280/32.6
D321,578 S * 11/1991 Gilbert ........................ D34/23
5,108,118 A * 4/1992 Schaevitz .................. 280/32.6
5,460,392 A * 10/1995 Hansen ...................... 280/32.6
5,863,053 A * 1/1999 Berry ........................ 280/32.6
6,079,941 A * 6/2000 Lee ............................ 414/812
6,095,532 A * 8/2000 Martin ....................... 280/32.6
6,199,877 B1 * 3/2001 Shockley ................... 280/32.6
6,398,234 B1 * 6/2002 Brown ...................... 280/32.6
6,641,146 B1 * 11/2003 Reese ........................ 280/32.6

* cited by examiner

*Primary Examiner*—Jeff Restifo

(57) ABSTRACT

A creeper for use in working in the interior of a vehicle has a lower body portion, with wheels affixed thereto for movement of the creeper. An upper body portion is connected to the lower body portion. A head piece is mounted to the upper body portion, and has a leading edge which forms an acute angle with one side of the head piece such that when the leading edge is placed flush against the door jam of the vehicle, the creeper may be positioned in the space formed by an open door of the vehicle and the door jam without interference by the door. The creeper also includes struts arranged in scissor fashion for raising and lowering the upper body portion. The head piece may be rotated 180 degrees transversely relative to said upper body portion, such that the creeper may be positioned in the space formed by an open door on either side of the vehicle.

4 Claims, 4 Drawing Sheets

ADJUSTABLE-HEIGHT CREEPER WITH ANGLED HEAD PIECE

FIELD OF THE INVENTION

This invention relates to support platforms, known as "creepers," used by mechanics especially for working in hard-to-reach places on cars, trucks, and other vehicles. More particularly, the invention relates to a creeper having adjustable height and an angled head piece which allows work to be performed under the dashboard of a vehicle.

BACKGROUND ART

Creepers have long been known and used by mechanics and others in a variety of work on hard-to-reach places, especially on automobiles and other vehicles. All creepers typically have rolling capability, for ease of movement from one location to another. Examples of rolling creepers include U.S. Pat. No. 1,457,117 to London; U.S. Pat. No. 1,631,561 to Symmes; U.S. Pat. No. 3,361,437 to Loftis; U.S. Pat. No. 4,244,594 to Hines; and U.S. Pat. No. 5,863,053 to Berry. Each of those Patents discloses a creeper with wheels for convenient rolling movement. Creepers have also been used which are adjustable in height, to allow for optimum working conditions to be maintained regardless of the height of the work piece. Examples of adjustable-height creepers include U.S. Pat. No. 2,843,391 to Pelletier; U.S. Pat. No. 4,682,750 to Rudolph; and U.S. Pat. No. 4,895,380 to Brooks.

Creepers are very useful tools for mechanics, and are widely employed, especially for working under vehicles. They may be rolled into spaces which are hard to reach, and thereby allow work to be performed with far less strain than would be possible without the use of a creeper. Adjustable-height creepers are also useful for maintaining just the right height to allow a mechanic to work in comfort. However, no creeper has previously been designed which is suitable for working under the dashboard of a vehicle. When a conventional creeper is used to provide support for working under a vehicle dashboard, the rectangular shape of the typical creeper does not fit well into the space between the open vehicle door and the door jam of the vehicle. If an attempt is made to place the end of the creeper flush with the door jam, then the body of the creeper will be interfered with by the door, due to the typical vehicle door being designed to only open to an acute angle. On the other hand, if a side of the body of the creeper is placed flush with the door of the vehicle, then the end of the creeper will not be flush with the door jam. Thus, the typical creeper will result in awkward positions for the user, when access to the space under a vehicle dashboard is attempted. A mechanic is thus faced with the choice of not using a creeper, or of using a creeper which is not adapted for use under a dashboard. In either instance, the mechanic finds himself in awkward positions, which will result in physical stress and strain, particularly to his back and neck.

Therefore, what is needed is a creeper which is adjustable in height and which will fit flush with the running board of a vehicle. In this way, a mechanic may be provided with the maximum support at just the right height, to facilitate working under the dashboard of a vehicle.

SUMMARY OF THE INVENTION

The present invention represents a significant advance in the art by providing a creeper which is adjustable in height, and which has a head piece with an edge set at an acute angle for abutting the door jam of a vehicle. This allows the user to be comfortably supported for work in the interior of the vehicle, particularly in areas under the dashboard. Preferably, the head piece is rotatable 180 degrees relative to the main body portion of the creeper, which allows the creeper to be used on either side of the vehicle.

For best results, the acute angle of the head piece is less than or equal to the acute angle formed by the door and the door jam. In this way, the head piece may be abutted flush against the door jam without causing the main portion of the creeper to be interfered with by the door.

Thus, a comfortable work platform is provided for a mechanic to work under a vehicle dashboard. The platform may be adjusted to precisely the desired height, and the head piece maintains a flush relationship with the door jam of the vehicle, to provide maximum support for the mechanic's neck and back. With a simple adjustment, the creeper may be used on either side of the vehicle, thus greatly increasing its usefulness.

Additional advantages of this invention will become apparent from the description which follows, taken in conjunction with the accompanying drawings.

DESCRIPTION OF THE PREFERRED EMBODIMENT

Figure 1:
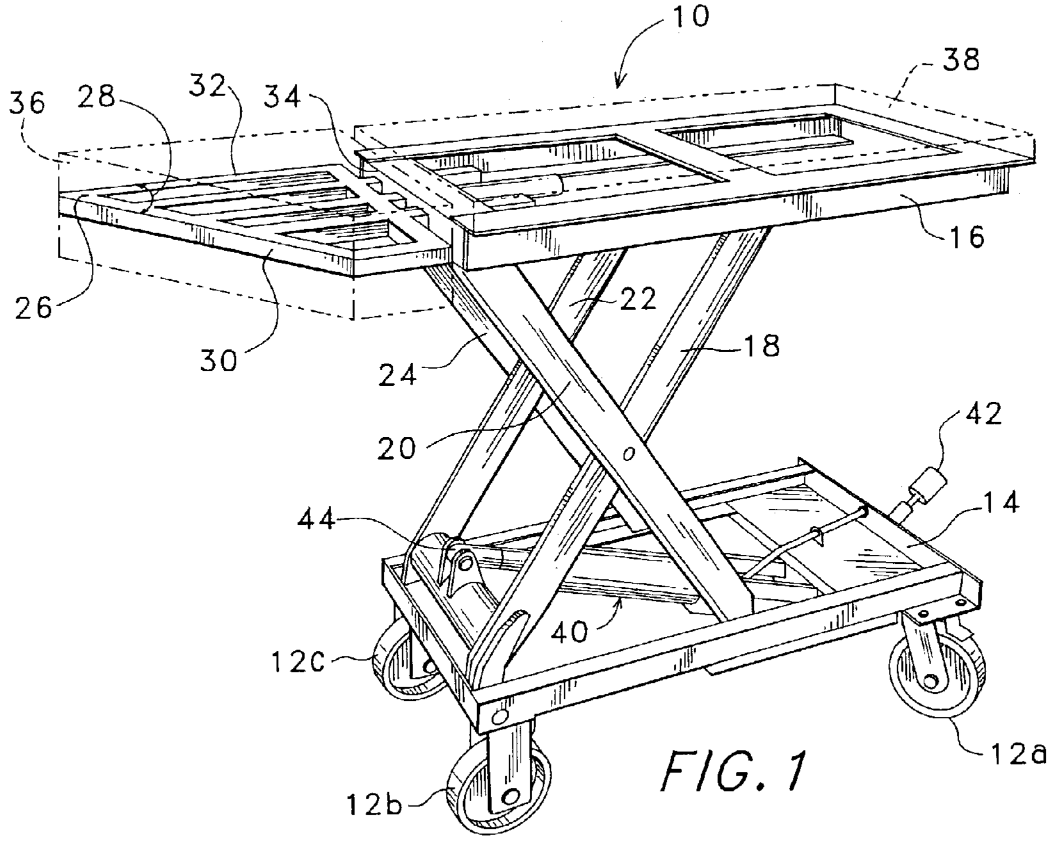
FIG. 1 is a perspective view of the creeper of the present invention, showing the upper body portion in a raised position.
Figure 2:
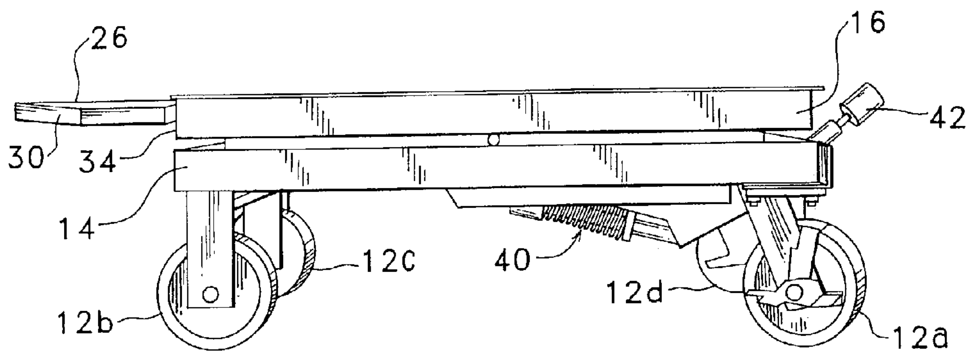
FIG. 2 is a side view of the creeper, showing the upper body portion in a lowered position.

Referring now to FIGS. 1 and 2, there is shown a creeper 10 according to the present invention. The creeper 10 has wheels 12 to allow for ease of movement from one location to another. A lower body assembly 14 rides directly on the wheels 12. An upper body portion 16 is supported by struts 18, 20, 22, 24, which are arranged in a scissor-like manner to allow the upper body portion 16 to be raised and lowered. Other arrangements are of course feasible for raising and lowering the upper body portion 16, but the scissor-like arrangement of struts is convenient and preferred.

A head piece 26 has an acute angle 28 between its leading edge 30 and one side 32, and is located at one end 34 of the upper body portion 16. Support covers 36 and 38 for the head piece 26 and the upper body portion 16, respectively, are shown by dashed lines in FIG. 1. These covers are for the support and comfort of the user of the creeper 10, and are shown directly in FIGS. 4, 5, and 7.

Power for the raising and lowering of the upper body portion 16 is provided by hydraulic cylinder assembly 40. A hydraulic lift pedal 42 may be conveniently operated by the user's foot. Lowering rod assembly 44 connects the hydraulic cylinder assembly 40 to the scissored struts 18,20,22,24 to extend the struts as shown in FIG. 1, or to collapse them as shown in FIG. 2. Any number of known conventional methods may be used to raise and lower the upper body portion 16. The hydraulic method is preferred because of its ease of operation and mechanical efficiency and reliability.

Figure 3:
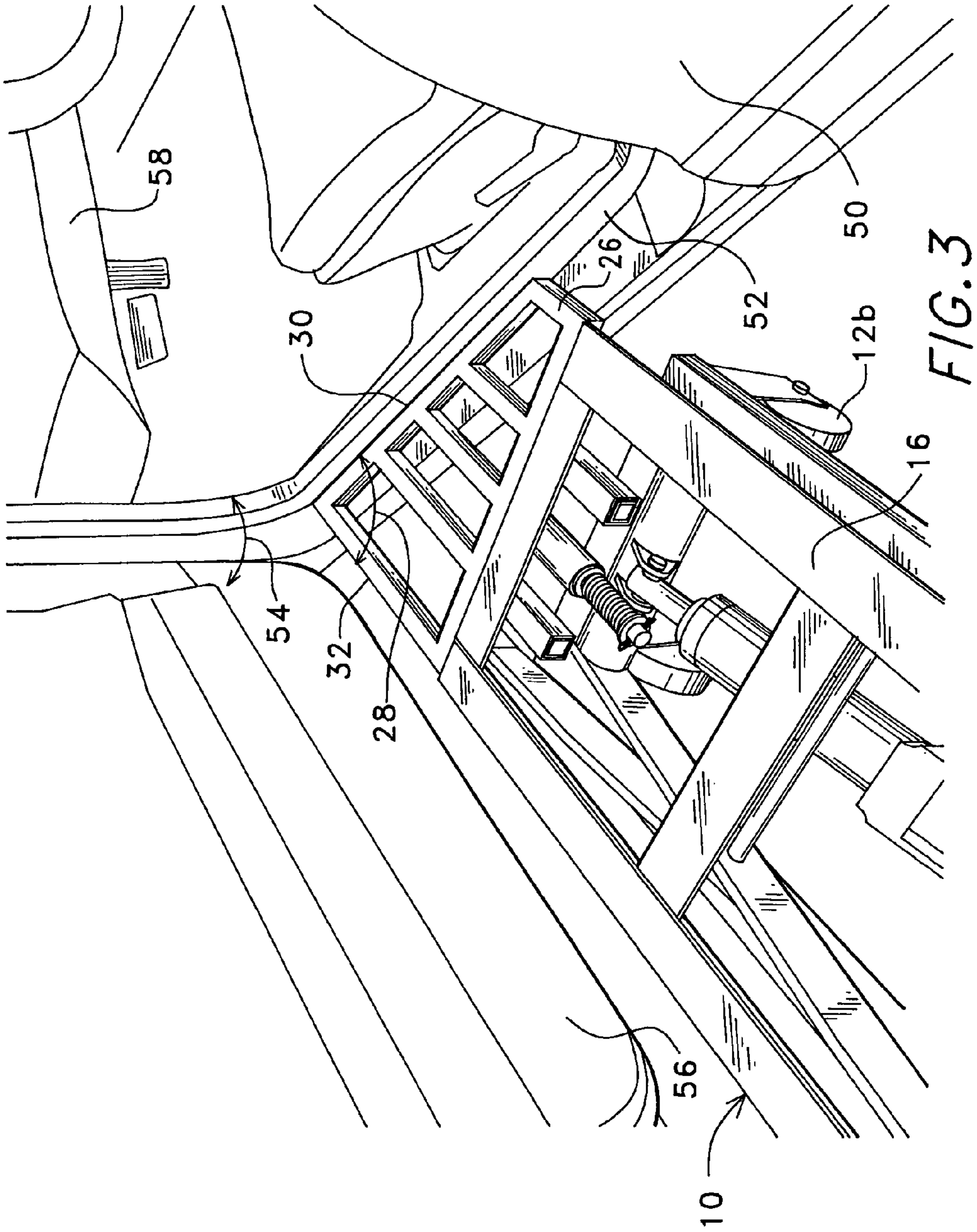
FIG. 3 is a perspective view of the creeper showing the head piece abutted against the running board of a vehicle.

Referring now to FIG. 3, the creeper 10 is shown with a vehicle 50. The leading edge 30 of the head piece 26 is abutted against the vehicle's door jam 52. As may be seen from FIG. 3, the acute angle 28 of the head piece 26 is approximately the same as the maximum angle 54 formed by the door 56 and the door jam 52, to allow the creeper 10 to be optimally fitted into place for work under the dashboard 58 of the vehicle 50. While best results may be achieved when the head piece angle 28 is the same as the door angle 54, any close approximation will allow greatly improved access to the interior of the vehicle 50. In general, ahead piece angle 28 which is more acute (less than) the door angle 54 will be preferable to a head piece angle which is less acute than the door angle, as a less acute head piece angle may cause the upper body portion 16 to be interfered with by the door when the head piece is placed flush with the door jam 52.

Figure 4:
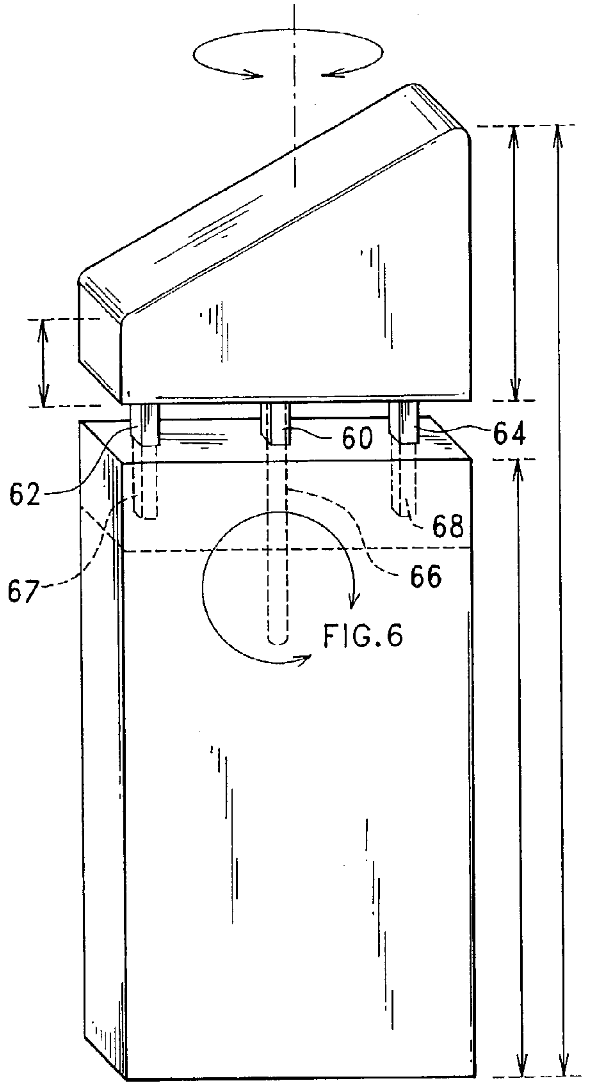
FIG. 4 is a perspective view showing the interconnection of the head piece and the upper body portion, and indicating the manner of rotation of the head piece about the main head shaft.
Figure 5:
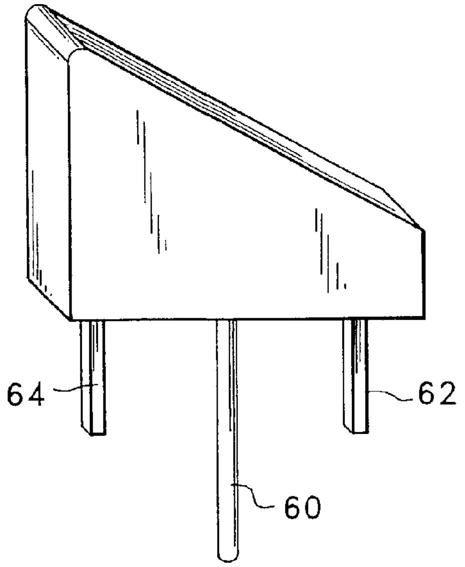
FIG. 5 is a view showing the head piece and the main head shaft and two support rods.
Figure 6:
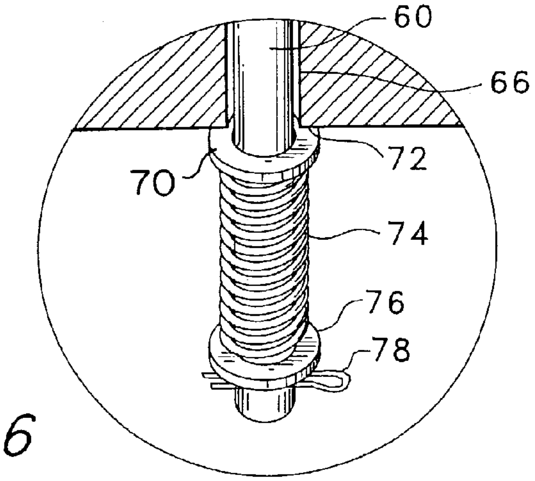
FIG. 6 is a detailed view of the spring and retaining assembly indicated in FIG. 4.

In order to allow the creeper 10 to be used on either side of the vehicle 50, it is useful for the head piece 26 to be reversible. This may conveniently be done in the manner shown in FIGS. 4, 5 and 6. As shown in FIGS. 4–6, the head piece 26 is mounted to the upper body portion 16 of the creeper 10 by a main head shaft 60, and support rods 62,64, which slide into slots 66,67,68 respectively. In the preferred embodiment, support rods 62,64 are shorter than the main shaft 60. As shown in FIG. 6, the main shaft 60 is preferably held in slot 66 by first retaining washer 70, which is held in abutted position with slot shoulder 72 by spring 74. Spring 74 is in turn held in fixed position by second retaining washer 76 and lock pin 78. With this arrangement, head piece 26 may be rotated by pulling the head piece away from the upper body portion 16 until support rods 62 and 64 are clear of their respective slots 67,68. The head piece 26 is then rotated 180 degrees, and the support rods 62,64 are re-inserted into their alternative slots 68,67 respectively. The entire head piece 26 is held firmly in place by tension from spring 74.

Figure 7:
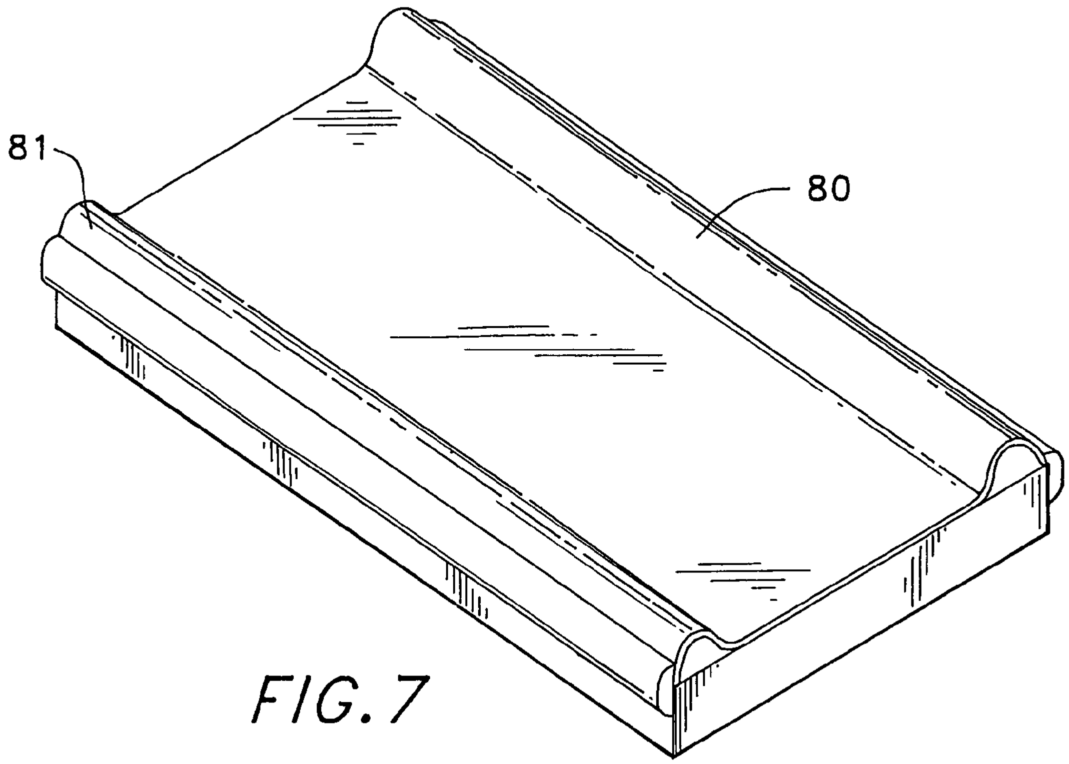
FIG. 7 is a perspective view of the support cover for the upper body, with optional side bumpers.

Additional optional features of the creeper are depicted in FIG. 7. FIG. 7 shows the support cover 38 for the upper body portion 16 of the creeper 10. This cover was depicted in dashed lines in FIG. 1. Preferably, the cover is made of fiberglass, although any durable shock-absorbing material could be used. Rubber bumpers 80,81 are optionally provided. These bumpers provide comfort for the user by eliminating contact with the sharp edges of the upper body 16 of the creeper 10. In addition, the bumpers give the user feedback as to the location of the edges of the creeper, so that the user may more easily position himself on the creeper.

Figure 8:
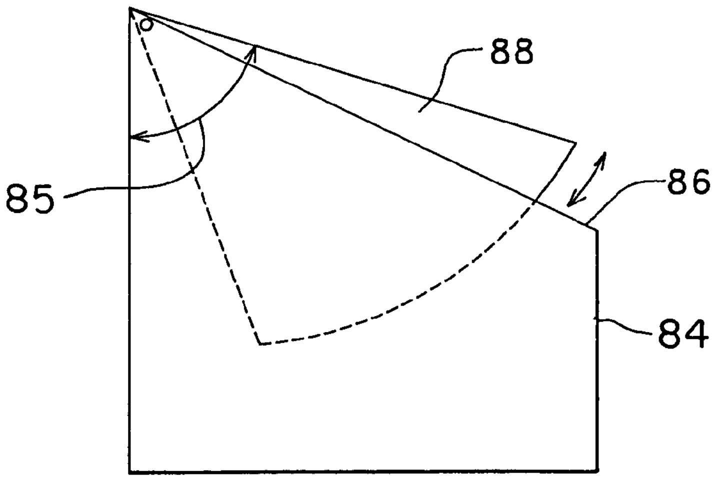
FIG. 8 is a top view of an optional adjustable head piece.

FIG. 8 shows optional adjustable head piece 84, which allows the acute angle 85 of the head piece to be adjusted to permit the head piece 84 to be placed against a door jam at various desired angles. This is accomplished by the head piece 84 having a sheath portion 86 and a blade portion 88, which slides into and out of the sheath much like the blade of a pocket knife folds into and out of the knife body.

The invention claimed is:

1. A creeper for use in working in the interior of a vehicle, said vehicle having at least one door on either side and a door jam which abuts the lower portion of said door when the door is closed, said creeper comprising:

a lower body portion, with wheels affixed thereto;

an upper body portion connected to said lower body portion;

a head piece mounted to said upper body portion, and having a leading edge which from a top view forms an acute angle with at least one adjacent side of said head piece such that when said leading edge is placed flush against the door jam of the vehicle, the creeper may be positioned in the space formed by an open door of the vehicle and the door jam without interference by the door; and means for rotating said head piece 180 degrees about the longitudinal axis of said upper body portion, such that the creeper may be positioned in the space formed by an open door on either side of the vehicle.

2. A method for working in the interior of a vehicle, said vehicle having at least one door on either side and a door jam which abuts the lower portion of said door when the door is closed, comprising the steps of:

providing a creeper including a lower body portion with wheels affixed thereto, an upper body portion connected to said lower body portion, and a head piece mounted to said upper body portion and having a leading edge which from a top view forms an acute angle with at least one adjacent side of said head piece;

positioning the leading edge of said head piece flush against the door jam of the vehicle, and the upper and lower body portions of the creeper in the space formed by an open door of the vehicle and the door jam without interference by the door; and providing means for rotating said head piece 180 degrees about the longitudinal axis of said upper body portion, such that the upper and lower body portions of the creeper may be positioned in the space formed by an open door on either side of the vehicle.

3. A creeper for use in working in the interior of a vehicle, said vehicle having at least one door on either side and a door jam which abuts the lower portion of said door when the door is closed, said creeper comprising:

a lower body portion, with wheels affixed thereto;

an upper body portion connected to said lower body portion;

a head piece mounted to said upper body portion, and having a leading edge which from a top view forms an acute angle with at least one adjacent side of said head piece such that when said leading edge is placed flush against the door jam of the vehicle, the creeper may be positioned in the space formed by an open door of the vehicle and the door jam without interference by the door; and wherein said upper body portion has a plurality of sides, and from a top view said adjacent side of said head piece forms a substantially straight line with one side of said upper body portion.

4. A method for working in the interior of a vehicle, said vehicle having at least one door on either side and a door jam which abuts the lower portion of said door when the door is closed, comprising the steps of:

providing a creeper including a lower body portion with wheels affixed thereto, an upper body portion connected to said lower body portion, and a head piece mounted to said upper body portion and having a leading edge which from a top view forms an acute angle with at least one adjacent side of said head piece; and positioning the leading edge of said head piece flush against the door jam of the vehicle, and the upper and lower body portions of the creeper in the space formed by an open door of the vehicle and the door jam without interference by the door; and wherein said upper body portion has a plurality of sides, and from a top view said adjacent side of said head piece forms a substantially straight line with one side of said upper body portion.

* * * * *